XR 3,264,583 213

CROSS REFERENCE

ENCE SEARCH ROO

Aug. 2, 1966 A. H. FITCH 3,264,583

DISPERSIVE ELECTROMECHANICAL DELAY LINE UTILIZING TAPERED DELAY MEDIUM

Filed June 12, 1963 4 Sheets-Sheet 1

INVENTOR
A. H. FITCH
BY John K. Mullarney
ATTORNEY

3264583
OR IN 333/30R

Aug. 2, 1966 A. H. FITCH 3,264,583

DISPERSIVE ELECTROMECHANICAL DELAY LINE UTILIZING TAPERED DELAY MEDIUM

Filed June 12, 1963 4 Sheets-Sheet 2

Aug. 2, 1966 A. H. FITCH 3,264,583

DISPERSIVE ELECTROMECHANICAL DELAY LINE UTILIZING TAPERED DELAY MEDIUM

Filed June 12, 1963 4 Sheets-Sheet 4

United States Patent Office 3,264,583

Patented August 2, 1966

3,264,583
DISPERSIVE ELECTROMECHANICAL DELAY LINE UTILIZING TAPERED DELAY MEDIUM

Arthur H. Fitch, Mountain Lakes, N.J., assignor to Bell Telephone Laboratories, Incorporated, New York, N.Y., a corporation of New York Filed June 12, 1963, Ser. No. 287,249
25 Claims. (Cl. 333—30)

This invention relates to delay devices and in particular to solid ultrasonic delay lines.

This application is a continuation-in-part of my copending application Serial No. 69,418, filed November 15, 1960, now abandoned.

Ultrasonic delay lines have in the past been designed to provide nondispersive delays of radio frequency pulses. More recently, delay lines have been developed that deliberately provide dispersive delays. The terms "dispersive" and "nondispersive" refer to the delay versus frequency characteristics of a delay line. If delay changes with frequency, the line is said to be "dispersive" and if the delay is constant, or nearly so, for all frequencies, the line is termed "nondispersive." Of the dispersive lines, the most useful designs have been those for which the delays are, most nearly, linear functions of frequency.

A strip delay line using a longitudinal mode of propagation has proven to be most useful arrangement, to date, for obtaining an approximately linear dispersive delay characteristic. The strip line is commonly operated at a frequency corresponding to the inflection point of the delay versus frequency characteristic for the first longitudinal mode of propagation in the strip. Operation about the inflection point frequency yields an approximately linear delay characteristic over a given frequency band. However, the frequency band over which even approximately linear operation is possible is limited at the high frequency end by the maximum in the delay characteristic, and at the low frequency end by a leveling off of the delay slope. This frequency band is, unfortunately, considerably smaller than the bandwidth of any of several commercially available ceramic transducer materials. In other words, the frequency band over which a dispersive strip delay line can be operated nearly linearly is limited, not by the transducer bandwidth, but by the shape of the delay curve.

It is accordingly a primary object of the present invention to increase the frequency band over which linear operation is achieved in a dispersive strip delay line.

A further object of the invention is to provide dispersive delay lines having delay versus frequency characteristics which are superior, both in linearity and bandwidth, to those heretofore obtainable.

In accordance with one embodiment of the present invention, these and other objects and advantages are realized in a strip delay line whose thickness dimension is deliberately tapered throughout the length of the strip. This tapering has been found to significantly increase the frequency range over which linear dispersive operation is possible. As will be clear hereinafter, the thickness taper can be linear or nonlinear; and, numerous variations in the slope, curvature and bandwidth of the delay characteristic can be realized through the selection of the type, degree and extent of this thickness taper.

In accordance with another embodiment of the present invention, the same objects and advantages are realized in a strip delay line whose free space shear wave velocity ($V_S$) is deliberately changed throughout the length of the strip. As will be clear hereinafter, a continuous change or a series of discrete changes in one or more of the elastic properties of the delay line material can be advantageously utilized to achieve the same results as are obtained by changing the delay line thickness.

The aforementioned changes in the thickness dimension and in the shear wave velocity ($V_S$) of a strip are not mutually exclusive, i.e., a given line may comprise various combinations of tapered sections and sections of different values of $V_S$.

Similar advantages can be achieved by changing the wall thickness and/or the free space shear wave velocity of a delay line having the form of a hallow cylinder.

For a clearer understanding of the nature of the invention and the additional advantages and objects thereof, reference is made to the following detailed description taken in connection with the accompanying drawings in which.

Figures 1, 2:
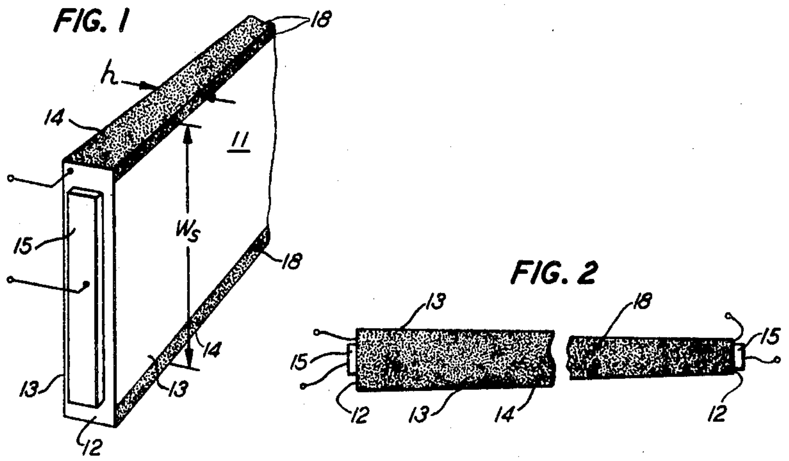
FIG. 1 is an enlarged fragmentary view of one end of a thickness-tapered, strip delay line constructed in accordance with the present invention.
FIG. 2 is a broken top view of the delay line of FIG. 1.

Referring now to the drawings and particularly to FIGS. 1 and 2, there is shown a delay medium 11 in the form of a strip having a width dimension $W_s$ many times greater than the thickness dimension $h$. Ideally, the delay medium should be an isotropic material, such as glass or vitreous silica, but polycrystalline materials such as ordinary metallic alloys (e.g., aluminum alloy, 5052–H32, having 95–97 percent aluminum, 2 percent magnesium, 0.2 percent chromium) have proven satisfactory provided grain size is sufficiently small compared to the wavelength of the elastic wave motion carried by the strip.

The end faces 12 of the strip are substantially perpendicular to the major surfaces 13 and to the minor surfaces 14. Conventional piezoelectric ceramic transducers 15 in the form of rectangular bars are bonded to the end faces using standard techniques. The transducers are poled in the thickness direction, electroded, and soldered to the line with the poling direction parallel to the length of the strip so as to produce and respond to vibrations in a thickness-longitudinal-mode. Accordingly, when one of the transducers is excited by an alternating voltage applied to the electroded areas of the major surfaces thereof, a thickness-longitudinal-mode of vibration is induced therein. This vibration in turn produces an elastic wave motion in the strip which propagates down the line. When the propagated energy reaches the transducer at the opposite end, a thickness-longitudinal-mode of vibration is induced therein and converted by the transducer to electrical energy. As will be clear to those in the art, the electrical and physical connections at each of the ends of the line are similar and therefore either transducer can be used as the input or output, i.e., the line is completely reciprocal.

When the input transducer is energized in the aforementioned manner, a longitudinal mode of elastic waves is propagated in the strip. The establishment of such a mode of propagation in a strip delay line has been shown to provide a delay that is an approximately linear function of frequency over a limited frequency band; see the article entitled "Dispersive Ultrasonic Delay Lines Using the First Longitudinal Mode in a Strip" by T. R. Meeker, I.R.E. Transactions on Ultrasonics Engineering, volume UE–7, No. 2, June 1960, pages 53–58.

Figure 3:
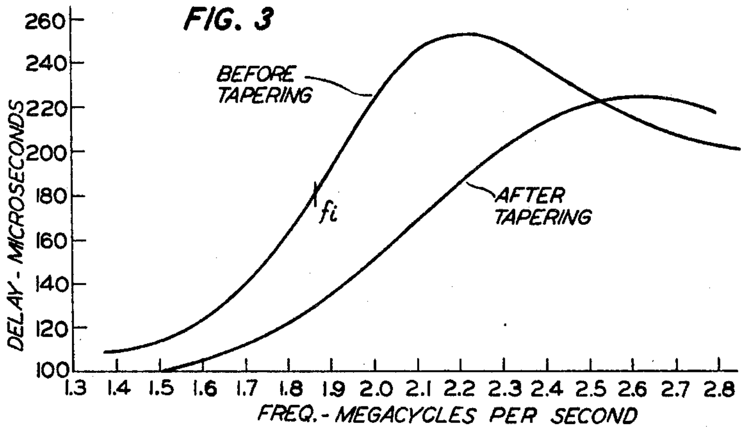
FIG. 3 shows the delay versus frequency characteristic curves of typical tapered and untapered strip delay lines.

The symmetrical (i.e., parallel major and minor surfaces) strip delay lines of uniform material disclosed in the above-noted article provide typical dispersive delay characteristics, such as illustrated by the curve of FIG. 3 labeled "Before Tapering," for first longitudinal mode propagation in the strip. As indicated by this curve, little if any dispersion is encountered at the low and high frequencies, i.e., the delay is more or less constant. At intermediate frequencies, however, the delay varies approximately linearly with frequency. The bandwidth over which more or less linear operation is possible is limited at the high frequency end by the maximum in the delay characteristic, and at the low frequency end by the leveling off of the delay slope. Operation is generally centered about the inflection point frequency $f_1$. The midband frequency of operation of the transducers is selected to correspond as closely as possible to this inflection point frequency.

The curve labeled "Before Tapering" in FIG. 3 shows the delay versus frequency characteristic for a symmetrical (i.e., untapered) strip delay line made from 5052–H32 aluminum alloy throughout and having the following dimensions:

| | Inches |
|---|---|
| Length | 18 |
| Width | 0.750 |
| Thickness | 0.0453 |

The bandwidth of the line operated within a prescribed departure from linearity (i.e., ±5 microseconds deviation from a straight line through the inflection point) was 0.39 megacycle. This corresponds to a fractional bandwidth of about 19 percent which is considerably smaller than the fractional bandwidth of any of several commercially available ceramic transducers.

Now in accordance with the principles of the present invention, the strip thickness $h$ of this same line was tapered uniformly from its original value of 0.0453 inch at one end to 0.0350 inch at the other. The delay as a function of frequency for this tapered strip is also shown in FIG. 3 by the curve labeled "After Tapering." Using the same criterion as above (±5 microseconds deviation), the fractional bandwidth for linear operation of the tapered strip is 35 percent, representing an 84 percent improvement over the untapered strip. As will be clear hereinafter, this thickness taper can be nonlinear as well as linear and it can even comprise various combinations of linear and nonlinear regions throughout the length of the strip; alternatively, as will be clear hereinafter, a similar improvement can be realized by changes in the delay line material which produce changes in the free space shear wave velocity ($V_s$) along the length of the strip.

The general theory and mathematics of propagation in elastic media has received extensive treatment in the literature; see, for example, "Longitudinal Modes of Elastic Waves in Isotropic Cylinders and Slabs" by A. N. Holden, Bell System Technical Journal, volume XXX, October 1951, pages 956–969; and "Wave Propagation in Elastic Plates: Low and High Mode Dispersion" by I. Tolstoy and E. Usdin, Journal of the Acoustical Society of America, volume 29, No. 1, January 1957, pages 37–42. The wave motion in a finite strip can be analyzed in terms of the wave motion in an infinite plate. And except for effects due to the minor surfaces of the strip, one can expect that the results for the finite strip would approach the results predicted for the infinite plate. Accordingly, from the general theory and equations which have been developed heretorfore, one can derive, for a strip delay line, a transcendental equation expressing the dependence of phase velocity V on angular frequency $\omega$. This transcendental equation, called the frequency equation, is written, for longitudinal mode propagation, as follows:

$$\frac{\tan \frac{\omega h}{2V_s}\left(1-\frac{V_s^2}{V^2}\right)^{1/2}}{\tan \frac{\omega h}{2V_p}\left(1-\frac{V_p^2}{V^2}\right)^{1/2}} = -\frac{4\left(\frac{V}{V_p}\right)\left(\frac{V}{V_s}\right)\left(1-\frac{V_p^2}{V^2}\right)^{1/2}\left(1-\frac{V_s^2}{V^2}\right)^{1/2}}{\left(2-\frac{V^2}{V_s^2}\right)^2}$$

where $$V_p = V_s\sqrt{\frac{2(1-\sigma)}{1-2\sigma}}$$

$\sigma$ is Poisson's ratio and is a constant of the material and, $h$ is the thickness of the strip, and $V_s$ is the free space shear wave velocity, a parameter indicative of the elastic property of the material and equal to $(\mu/\rho)^{1/2}$, where $\mu$ is the shear modulus and $\rho$ is the density of the delay material. For a particular value of $\sigma$ the equality of the two sides of this equation for various combinations of $\omega h/V_s$ and $V/V_s$ gives the dependence of $V/V_s$ on $\omega h/V_s$ for the possible modes of the system.

The group velocity (U) is dependent on the frequency and is given by the equation $$\left[U = \frac{V}{1-\frac{\omega}{V}\frac{dV}{d\omega}}\right]$$

Figure 4:
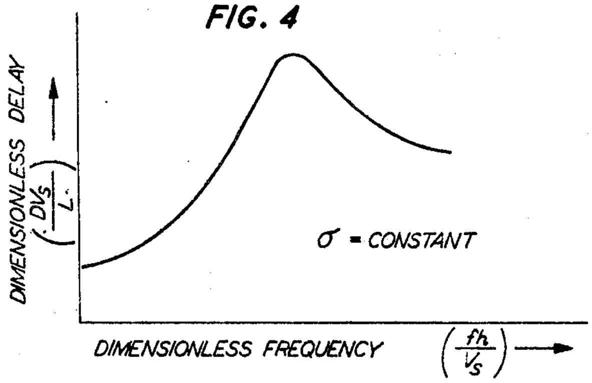
FIG. 4 is a curve which illustrates the solution to the frequency equation for the first longitudinal mode.

The delay of a strip line is equal to the reciprocal of group velocity (U) times the length of the line (L). Accordingly, for a strip delay line with a particular value of $\sigma$, the frequency equation can be solved to determine the delay in dimensionless form ($DV_s/L$) as a function of a dimensionless frequency quantity ($fh/V_s$). The solution of the frequency equation for the first longitudinal mode when plotted, assumes the shape of the curve shown in FIG. 4. The delay versus frequency characteristic for a strip delay line of known material and dimensions can be calculated from the equations directly or from the solution to the equation for the particular mode of interest. Any of the commercially available digital computers can be readily programmed to perform these calculations.

Figure 5:
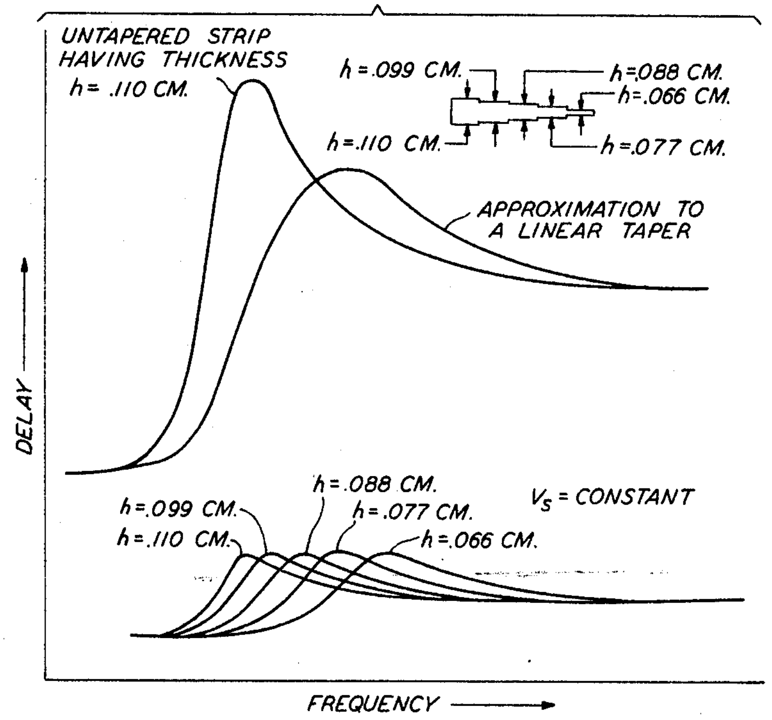
FIG. 5 is a delay versus frequency graph which is useful in the explanation of the thickness-tapered embodiment of the present invention.

Calculations have been perfomed in which a tapered strip of uniform material was approximated by five strip sections of uniformly decreasing thickness. The thickness of these five sections and the delay characteristic curves of each are shown in FIG. 5. The curve labeled "$h$=.110 cm." is the calculated delay characteristic curve for that section of the strip whose thickness is .110 centimeter, and so on for the other curves and strip sections. If the ordinates of these five curves are added together point by point, the curve labeled "Approximation to a Linear Taper" will be obtained. Thus, this latter curve constitutes the over-all delay versus frequency characteristic of the step tapered strip line diagrammatically illustrated in FIG. 5.

The over-all delay characteristic for an untapered strip line of corresponding material and length can be similarly obtained. If each of the five sections of the line are assumed to be of thickness .110 centimeter, the over-all delay characteristic is obtained by multiplying each of the ordinate points of curve "$h$=.110 cm." by five. The curve labeled "Untapered Strip Having Thickness $h$=.110 cm." is thus derived. This latter curve and the curve labeled "Approximation to a Linear Taper" show the same qualitative features as the experimentally obtained curves of FIG. 3; in particular, the curve which approximates the delay characteristic of the tapered strip exhibits a much larger fractional bandwidth than does the curve for the untapered strip.

Figure 6:
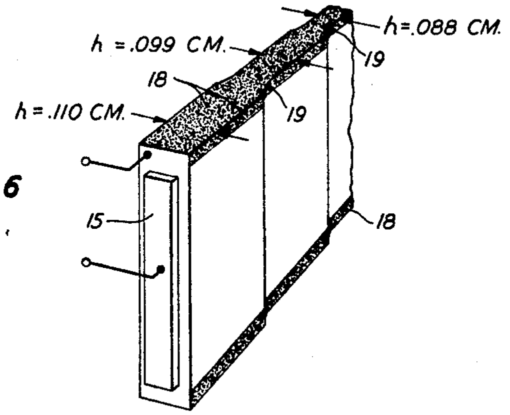
FIG. 6 is an enlarged fragmentary view of one end of a dispersive strip delay line having a series of discrete sections of different thickness in accordance with the invention.

In practice, strip thickness is not sharply reduced in the step-like manner diagrammatically illustrated in FIG. 5. The extremely sharp discontinuities of the steps would cause undesirable energy reflections and losses. Instead, a line as shown in FIG. 6 with filleted steps 19 providing a smooth transition between sections, advantageously over a distance of ten acoustic wavelengths or more, or a smoothly tapered line as shown in FIGS. 1 and 2 having the same degree of taper as the step-like tapered line, can be utilized to advantage. For example, a uniform or linear taper may be substituted for the step-like taper illustrated in FIG. 5. This linear taper would have an average thickness, for each of the five longitudinally extending sections, equal to the indicated thickness of the stepped section it replaces. Thus, for the first fifth of the line, the average thickness would be equal to .110 centimeter, for the second fifth, the average thickness would be .099 centimeter, et cetera. A line tapered uniformly as described has been constructed and found to provide a delay versus frequency characteristic that corresponds quite closely to the delay curve labeled "Approximation to a Linear Taper." It should be clear, however, that as a practical matter a properly tapered strip delay line would not be arrived at in the described manner. Mathematical techniques, such as "linear programming," are available and can be advantageously utilized to determine the taper necessary to achieve a given characteristic.

Figure 7:
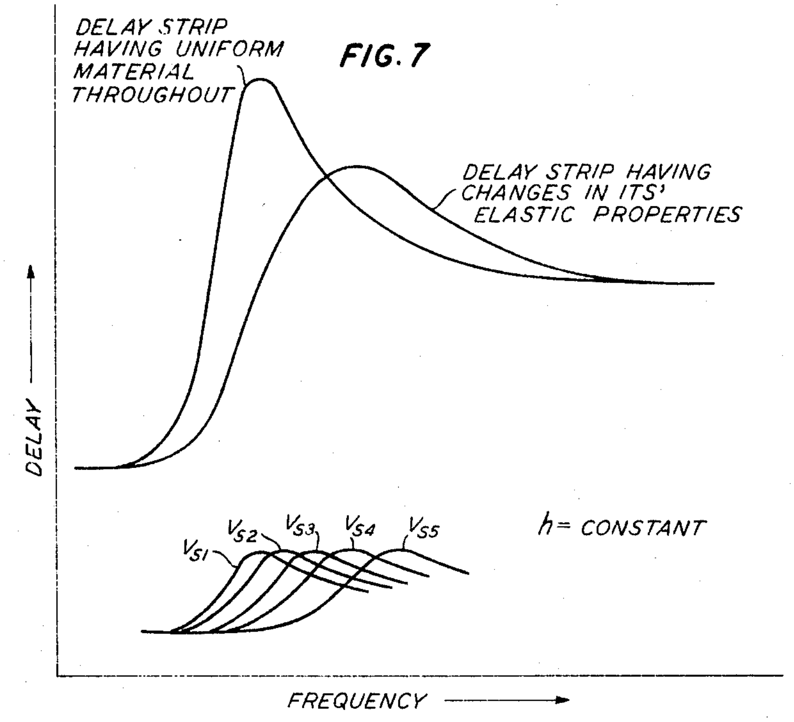
FIG. 7 is a delay versus frequency graph which is useful in the explanation of the embodiment of the present invention which utilizes changes in the elastic properties of the delay material.

Similar curves to those presented in FIG. 5 for sections of different thickness can also be presented for sections of uniform thickness but of varying elastic parameters. Referring now to FIG. 7, curves are shown for five sections with the same thickness but with different values of shear wave velocity. The curve labeled "$V_{s1}$" is the delay characteristic curve for that section of delay strip having elastic properties such that its shear wave velocity is equal to $V_{s1}$, and so on for the other four curves and strip sections. If the ordinates of these five curves are added together point by point, the curve labeled "Delay Strip Having Changes in Its Elastic Properties" will be obtained. Thus, this latter curve constitutes the over-all delay versus frequency characteristic of a strip delay line with uniform thickness throughout but with changes in shear wave velocity along the length of the line.

The over-all delay characteristic for a strip line of corresponding thickness and length but of uniform elastic properties throughout can be similarly obtained. If each of the five sections of the line are assumed to have a shear wave velocity of $V_{s1}$, the over-all delay characteristic is obtained by multiplying each of the ordinate points of curve "$V_{s1}$" by five. The curve labeled "Delay Strip Having Uniform Material Throughout" is thus derived. This latter curve and the curve labeled "Delay Strip Having Changes in Its Elastic Properties" show the same qualitative features as the curves of FIG. 3 for the tapered and untapered lines; in particular, the curve for the delay of a strip line with changes in its elatsic properties exhibits a much larger fractional bandwidth than does the curve for the line of uniform material throughout.

Figure 8:
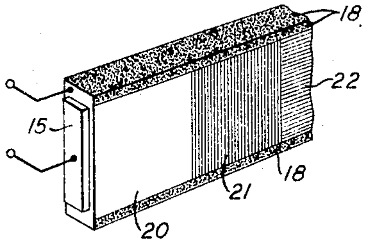
FIG. 8 is an enlarged fragmentary view of one end of a delay line having a series of sections of different values of shear wave velocity in accordance with the invention.

Referring now to FIG. 8, a strip delay line is shown for which sections 20 through 22 have the same thickness but have different elastic properties of the delay material such that a change in the free space shear wave velocity occurs from one section to another. The shear wave velocity of a particular sectional material can either be computed from the values of shear modulus ($\mu$) and density ($\rho$) found in handbooks for the particular material or it can be measured directly on a strip delay line made up of the material with transducers on each end. Various materials can be used; in the case of a metal line, all of the sections may contain the same dominant metal with variations in the alloying from section to section in order to produce the variations in shear wave velocity. At high frequencies where the thickness of a metal strip would be so small as to be unworkable because of its fragility, glass-like materials with a higher shear wave velocity such as glass, silica, and sapphire may be used with variations in the amount of impurities to cause the variations in shear wave velocity. The sections can be held together either by physical clamping or by being bonded to each other using techniques similar to the standard techniques by which ceramic transducers are joined to delay lines.

Figure 9:
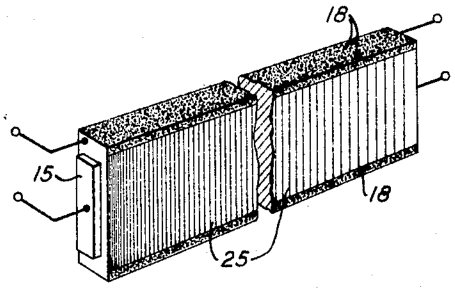
FIG. 9 is a broken pictorial view of a dispersive strip delay line having a continuous change throughout its length in the value of shear wave velocity.

In order to minimize undesirable energy reflections and losses, it is preferable to minimize the magnitude of the change in shear wave velocity which occurs between adjacent sections. In this regard, referring now to FIG. 9, a line functionally analogous to the smoothly tapered line is shown wherein the shear wave velocity of delay medium 25 is changed as a continuous parameter along the length of the line. To affect the continuous changes in shear wave velocity any of several well-known techniques can be utilized to continuously vary the elastic properties along the length of the line. For example, in the case of a metal strip, variations in its plastic properties and therefore in its shear wave velocity along its length can be produced by variations in the heat treatment as the strip is moved through a tunnel oven; or in the case of materials which can be seed grown, such as semiconductors, variations can be made in the doping level by changing the content of the melt thereby causing changes in the elastic-shear modulus and accordingly in the shear wave velocity of the material. Although the rate of change in $V_s$ which is necessary to achieve a given characteristic may be determined by an extrapolation of the discrete changes of $V_s$ in a sectionalized line, here again, as in the case of the line with a smoothly tapered thickness, mathematical techniques, such as "linear programming" are available and can be advantageously utilized.

The tapering of the thickness of a strip delay line in effect shifts the maximum of the delay characteristic to higher frequencies and this thereby increases the frequency range over which linear operation is possible. This can be explained, qualitatively, by the fact that dispersive effects occur when the wavelength ($\lambda$) of the energy is of the same order as strip thickness. Now referring again to the curve of Dimensionless Delay versus Dimensionless Frequency of FIG. 4, the value of the quantity ($fh/V_S$) about which linear dispersive delay is obtained can be made to correspond to different frequencies not only by changing the thickness $h$, but also by changing the value of $V_s$. Accordingly, dispersive effects will occur at higher and higher frequencies for thinner and thinner strips, or for greater and greater values of shear wave velocity in the strip. This is borne out by the calculated specific delay characteristic curves of FIGS. 5 and 7. As the strip thickness is successively reduced, or alternatively as indicated hereinbefore as the shear wave velocity is successively increased, dispersion is seen to occur at successively high frequencies.

It will be clear from the foregoing that numerous variations in the slope, curvature and bandwidth of the delay characteristic can be realized through the selection of the type, degree and extent of the thickness taper or change in the elastic properties. For example, in FIG. 5, numerous changes in the curve labeled "Approximation to a Linear Taper" can be envisioned if the five delay characteristic curves are shifted relative to each other.

Figure 10:
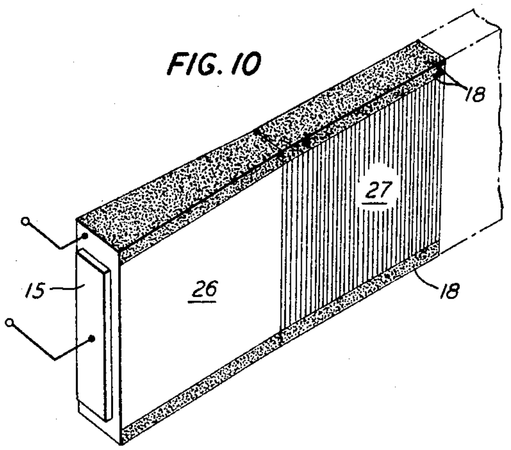
FIG. 10 is an enlarged fragmentary view of one end of a dispersive strip delay line combining at least one thickness taper section with one or more sections of different values of shear wave velocity.

It will be clear from the foregoing that a strip delay line using both changes in the thickness and changes in the elastic properties can be utilized to advantage to achieve a given characteristic. For example, referring now to FIG. 10, a strip delay line is shown for which end region 26 is tapered with decreasing thickness toward region 27 which has a constant thickness throughout its length, but an increased value of shear wave velocity from that of region 26. Additional sections having further changes in shear wave velocity can also be added in order to obtain a desired over-all delay characteristic. In utilizing a section with increased $V_s$ such as region 27, rather than an equivalent section with a thickness less than the minimum thickness of region 26, a more rigid delay line less susceptible to breakage in handling is obtained. The strip thickness $h$ will have a mean value of the order of a wavelength at the inflection point frequency. In order to aid in keeping the main portion of the beam away from the minor surfaces as much as possible and thereby reduce the energy reflections and unwanted mode conversion which result from energy interaction with the minor sources, the strip width $W_s$ should preferably be somewhat greater than transducer length ($L_t$), and $L_t$ should generally be of the order of ten or more wavelengths at the midband frequency of operation. This latter requirement insures greater directivity of the radiated beam of elastic wave motion which is produced in the strip by transducers 15.

The minor surfaces and adjacent portions of the major surfaces in all of the above species of the strip delay line are coated or covered with an absorber material 18, which can, for example, comprise an adhesive tape having a cloth or plastic type backing. As the name implies and as will be clear to those in the art, this material absorbs elastic waves incident upon the minor surfaces and thereby significantly reduces the energy reflections and unwanted mode conversion which result from the presence of the minor surfaces.

Figure 11:
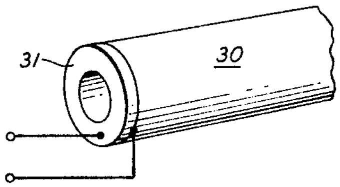
FIG. 11 is an enlarged fragmentary view of one end of a hollow cylinder dispersive delay line constructed in accordance with the invention.
Figure 12:
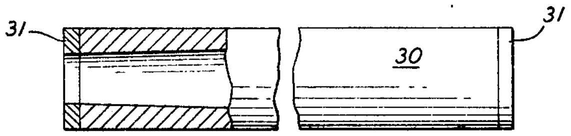
FIG. 12 is a broken side elevational view of the FIG. 11 delay line, illustrating the tapering wall thickness of the same.
Figure 13:
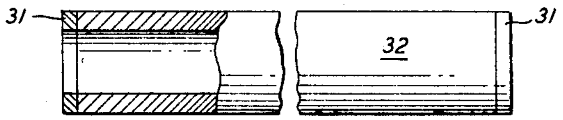
FIG. 13 is a broken side elevational view, partly in cross section, of a hollow cylinder delay line having a continuous change in the value of shear wave velocity throughout the length thereof.

This problem of energy reflections from the minor surfaces is eliminated in a delay line having the form of a hollow cylinder. The hollow cylinder can be thought of as comprising a strip line that is rolled up with the minor surfaces thereof in integral contact. The hollow cylinder is thus the equivalent of a strip without edges or minor surfaces. Such delay lines are shown in FIGS. 11, 12 and 13.

Toroidal piezoelectric ceramic transducers 31 are bonded to the end faces of the hollow cylindrical delay lines 30 and 32 using standard techniques. The transducers 31 are poled in the thickness direction and soldered to the lines 30 and 32 with the poling direction parallel to the length of the lines so as to produce and respond to vibrations in a thickness-longitudinal-mode.

A hollow cylinder delay line, energized as described, has been found to provide a dispersive delay characteristic substantially identical to that of the strip line. Further, in accordance with the present invention, if the wall thickness of the hollow cylinder is tapered as shown in FIG. 12, or if the elastic properties of the material are changed such that the shear wave velocity is changed along the length of the line as shown in FIG. 13, an increase in the linear dispersive frequency band is obtained. Since the hollow cylinder delay line species of the present invention is the functional equivalent of the strip delay line species heretofore described, the foregoing detailed explanation of the latter will suffice for both. Accordingly, variations analogous to those described in connection with the strip delay lines of FIGS. 6, 8 and 10 can also be utilized in a hollow cylinder delay line in order to practice the invention herein described.

The frequency range over which the invention may be practiced is the same as the frequency range over which ultrasonic delay lines are operative; in other words, no limitations on frequency are inherent to the inventive concepts. The frequency limitations which do exist for ultrasonic delay lines are well known in the art, most notable of which are the physical bulk of the transducers and delay line at low frequencies, and the losses and fragility of the delay material at high frequencies.

Although the inventive concepts have been described in connection with delay lines using the first longitudinal mode of propagation, they may also be advantageously utilized to obtain variations in the over-all delay versus frequency dispersive characteristics which are obtained by using other modes of propagation.

Accordingly, it is to be understood that the above-described embodiments are merely illustrative of the application of the principles of the present invention. Numerous other arrangements and modifications can be devised by those skilled in the art without departing from the spirit and scope of the invention.

What is claimed is:

1. A delay device for providing linear dispersive delay versus frequency comprising an elongated delay line of ultrasonic transmission material having elastic properties expressible in terms of shear wave velocity ($V_s$), said delay line having energy-guiding major surfaces that are spaced from each other to define a relatively small thickness ($h$) therebetween, and a pair of electromechanical transducers respectively mounted at the ends of the elongated delay line, said delay line having a change along its length in the ratio ($h/V_s$), said change causing the dispersion in delay of said delay device to be linear over a larger band of frequencies than for a delay device wherein the ratio ($h/V_s$) is constant.

2. A delay device for providing linear dispersive delay versus frequency comprising an elongated delay line of ultrasonic transmission material having elastic properties expressible in terms of shear wave velocity ($V_s$), said delay line having energy-guiding major surfaces that are spaced from each other to define a relatively small thickness ($h$) therebetween, a thickness-longitudinal-mode transducer mounted on one end of the line for generating in said line a longitudinal mode elastic wave motion, and a thickness-longitudinal-mode transducer mounted on the other end of the line for generating electrical signals in response to the longitudinal mode wave motion in said line, said delay line having a variation along its length in the ratio ($h/V_s$), said variation in the ratio causing the dispersion in delay of said delay device to be linear over a larger band of frequencies than for a delay device having a delay line wherein the ratio ($h/V_s$) is constant.

3. A delay device as defined in claim 2 wherein the line thickness varies throughout the length of the line.

4. A delay device as defined in claim 2 wherein the average thickness of the line is of the order of a wavelength at the midband frequency of operation.

5. A delay device as defined in claim 2 wherein at least one of the elastic properties of said transmission material is varied throughout the length of the line to thereby effect a variation in the parameter $V_s$.

6. A delay device with a substantially linear delay versus frequency characteristic over a comparatively wide frequency band comprising a delay line of ultrasonic transmission material in the form of an elongated thin strip of rectangular cross section, a pair of electromechanical transducers respectively mounted at the ends of the elongated strip delay line, said strip having a width dimension of at least ten wavelengths at the midband frequency of operation and a variation along its length in the ratio $(h/V_s)$ for the purpose of increasing the frequency band over which the delay versus frequency characteristic is substantially linear, where $h$ is the thickness of the strip, and $V_s$ is the shear wave velocity.

7. In combination, an elongated thin strip comprised of ultrasonic transmission material having elastic properties expressible in terms of shear wave velocity $(V_s)$, said strip having a rectangular cross section with a width dimension many times that of the thickness dimension $(h)$ throughout the length of the strip, thickness-longitudinal-mode transducer means mounted at one end of said strip for generating in said strip a longitudinal mode elastic wave motion, and thickness-longitudinal-mode transducer means mounted at the other end of said strip for generating electrical signals in response to the longitudinal mode wave motion in the strip, said strip having a variation along its length in the ratio $(h/V_s)$ for the purpose of increasing the frequency band over which the dispersion in delay of said strip is substantially linear.

8. The combination as defined in claim 7 wherein the strip thickness is continuously tapered throughout the length of the strip.

9. The combination as defined in claim 7 wherein the strip thickness is changed in a series of discrete steps along the length of the line.

10. The combination as defined in claim 7 wherein the parameter $V_s$ is varied continuously throughout the length of the strip.

11. The combination as defined in claim 7 wherein said strip is comprised of discrete longitudinal sections having different values of $V_s$.

12. The combination as defined in claim 7 wherein the thickness of said strip is varied over a part of the length of said delay line with the parameter $V_s$ being varied over another part of the length of the line.

13. A dispersive strip delay line as defined in claim 7 wherein the strip thickness at one end of the strip is of the order of a wavelength at the lowest frequency of a predetermined frequency band of operation and at the other end is of the order of a wavelength at the highest frequency of said predetermined frequency band.

14. In combination, an elongated delay line of ultrasonic transmission material in the form of a thin strip, said strip having a width dimension of at least ten wavelengths at the midband frequency of operation and a thickness dimension which is tapered throughout the length of the strip for the purpose of increasing the bandwidth in frequency over which the dispersive delay of said strip is substantially linear, said thickness dimension having a mean value of the order of a wavelength at said midband frequency of operation, absorber material covering at least the thin edges of the strip, and a pair of thickness-longitudinal-mode transducers respectively mounted at the ends of the elongated strip delay line.

15. In combination, an elongated delay line of ultrasonic transmission material in the form of a thin strip, said strip having a width dimension of at least ten wavelengths at the midband frequency of operation and a thickness dimension of the order of a wavelength at said midband frequency of operation, said ultrasonic material having a change in at least one of its elastic properties along its length to thereby effect a change in shear wave velocity, said change in elastic properties thereby causing the dispersive delay of said delay line to be linear over a larger band of frequencies, absorber material covering at least the thin edges of the strip, and a pair of thickness-longitudinal-mode transducers respectively mounted at the ends of the elongated strip delay line.

16. In combination, an elongated delay line comprised of ultrasonic transmission material in the form of a hollow cylinder, a toroidal thickness-longitudinal-mode transducer mounted on one end of the line for generating in said line a longitudinal mode elastic wave motion, and a toroidal thickness-longitudinal-mode transducer mounted on the other end of the line for generating electrical signals in response to the longitudinal mode wave motion in said line, said line having a variation along its length in the quantity $(h/V_s)$ for the purpose of increasing the frequency range of said electrical signals over which the dispersive delay of said delay line is substantially linear, where $h$ is the wall thickness of the cylindrical line, and $V_s$ is the shear wave velocity.

17. The combination as defined in claim 16 wherein the wall thickness is tapered throughout the length of the line.

18. The combination as defined in claim 16 wherein the parameter $V_s$ is varied continuously throughout the length of the strip.

19. The combination as defined in claim 16 wherein the line is comprised of discrete longitudinal sections having different values of $V_s$.

20. The combination as defined in claim 16 wherein the wall thickness at one end of the line is of the order of a wavelength at the lowest frequency of a predetermined frequency band of operation and at the other end is of the order of a wavelength at the highest frequency of said predetermined frequency band.

21. A broadband dispersive acoustic delay line for a given band of frequencies comprising an elongated delay medium of ultrasonically transmissive material having a cross section with a major dimension many times greater than its minor dimension, and electromechanical transducing means at each end of said elongated medium for launching into and receiving from said medium acoustic waves in the thickness-longitudinal mode, said minor dimension varying between a maximum thickness on the order of a wavelength of the lowest frequency of said given band and a minimum thickness on the order of a wavelength of the highest frequency of said given band.

22. A broadband dispersive acoustic delay line for a given band of frequencies comprising an elongated delay medium of ultrasonically transmissive material having a cross section with a major dimension many times greater than its minor dimension, and electromechanical transducing means at each end of said elongated medium for launching into and receiving from said medium acoustic waves in the thickness-longitudinal mode, the elastic properties of said material producing a variation in the shear wave velocity of said material between a maximum shear wave velocity for the highest frequency of said given band and a minimum shear wave velocity for the lowest frequency of said given band.

23. A broadband dispersive acoustic delay line for a given band of frequencies comprising an elongated delay medium of ultrasonically transmissive material having a cross section many times greater than its minor dimension, and electromechanical transducing means at each end of said elongated medium for launching into and receiving from said medium accoustic waves in the thickness-longitudinal mode, said delay medium including means along the length of the medium for translating the maximum delay per unit length of said medium in the frequency domain.

24. A broadband dispersive acoustic delay line as defined in claim 23 wherein said means along the length of the medium is a variation in said minor dimension.

25. A broadband dispersive acoustic delay line as defined in claim 23 wherein said means along the length of the medium is a variation in $V_s$, where $V_s$ is the shear wave velocity.

References Cited by the Examiner

UNITED STATES PATENTS

| | | | |
|---|---|---|---|
| 2,485,722 | 10/1949 | Erwin | 333—30 |
| 2,703,867 | 3/1955 | Arenberg | 333—30 |
| 2,867,777 | 1/1959 | Robinson | 333—30 |
| 2,982,926 | 5/1961 | May | 333—30 |
| 3,041,556 | 6/1962 | Meitzler | 333—72 |
| 3,133,258 | 5/1964 | Meitzler | 333—72 |

HERMAN KARL SAALBACH, *Primary Examiner.*

C. BARAFF, *Assistant Examiner.*